United States Patent [19]

Tietze

[11] 4,047,263
[45] Sept. 13, 1977

[54] SOFT-FEEL HANDLE AND METHOD OF MAKING SAME

[75] Inventor: Kenneth V. Tietze, Algonac, Mich.

[73] Assignee: Textile Trim, Inc., Fair Haven, Conn.

[21] Appl. No.: 741,303

[22] Filed: Nov. 12, 1976

[51] Int. Cl.² .............................................. B65D 25/28
[52] U.S. Cl. ....................................... 16/125; 190/57
[58] Field of Search ................... 16/125, 116 R, 119, 16/110 R; 190/57, 39

[56] References Cited

U.S. PATENT DOCUMENTS

| 3,095,641 | 7/1963 | Siegel | 190/57 X |
|---|---|---|---|
| 3,736,621 | 6/1973 | Szabo | 16/116 R |
| 3,737,944 | 6/1973 | Szabo | 16/110 R |
| 3,758,360 | 9/1973 | Szabo | 156/273 |
| 3,892,615 | 7/1975 | Szabo | 156/273 |
| 3,952,383 | 4/1976 | Moore et al. | 190/57 X |

*Primary Examiner*—Andrew V. Kundrat
*Attorney, Agent, or Firm*—Cullen, Settle, Sloman & Cantor

[57] ABSTRACT

An improved soft-feel handle construction including first and second parts each part including a flexible thermoplastic sheath wrapped around a cushioning member. One of the parts includes a thin, flat elongated conductive member positioned between the thermoplastic sheath and the cushion. The first and second handle parts are dielectrically sealed together with each handle part covering the seal so that the seal is formed interiorly of the handle.

4 Claims, 4 Drawing Figures

U.S. Patent     Sept. 13, 1977     4,047,263
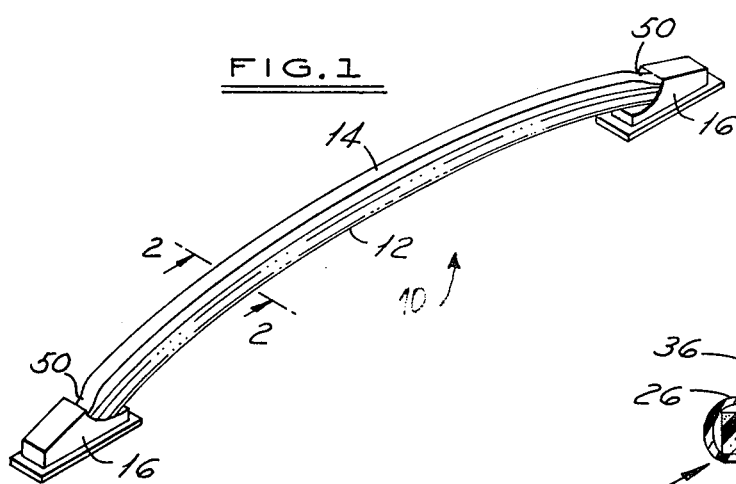
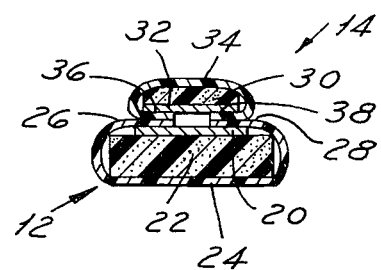
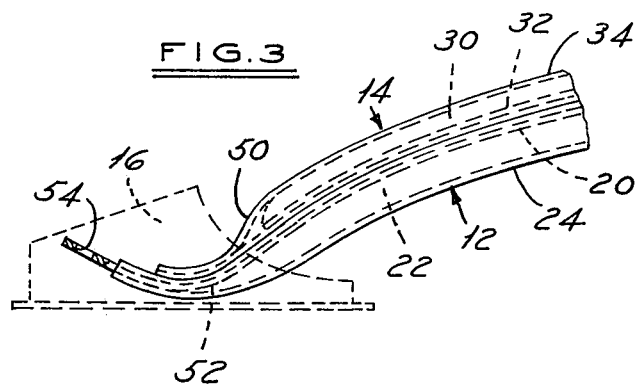
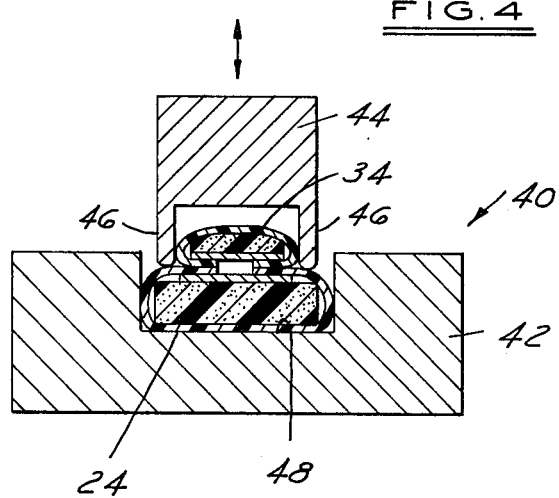

SOFT-FEEL HANDLE AND METHOD OF MAKING SAME

BACKGROUND OF INVENTION

This invention relates generally to a handle for automobiles, luggage, carrying cases and the like. More specifically, the present invention is directed to an improved soft-feel handle and a method of making a soft-feel handle which has an internal metallic stiffener, so that the handle may be secured to brackets and with cushioning material on both sides of the metal.

Soft-feel handles are known as described generally in U.S. Pat. Nos. 3,736,621, 3,758,360, and 3,892,615. The soft-feel handles disclosed in each of these prior patents include a metallic central member, for attaching to brackets or the like, cushioning members on each side of the metallic member, and a thermoplastic sheath surrounding the combination of the cushioning members and metal strip. The thermoplastic sheath is dielectrically sealed to complete the assembly.

Two problems have arisen with respect to the prior art handles and methods of making them. First, in the use of dielectric sealing, it is common to utilize a conductive foil inside the handle adjacent the edges of the thermoplastic sheath which are to be sealed together. During the dielectric sealing step, current flows through the conductive foil to complete the circuit between the die or electrode of the sealing apparatus and the bed of the sealing apparatus. The conductive foil remains inside the finished handle thus increasing the cost of these handles.

A second problem with the prior art handles is one of aesthetics. It is undesirable to have the seal exposed to view and it is also undesirable to have the seal on the underside of the handle where it can be detected by the fingers or hand when the handle is gripped.

Thus the present invention overcomes both of these disadvantages by providing a soft-feel handle where the seals are hidden from view and cushioned by the soft-feel handle itself and where the conductive foil has been eliminated.

SUMMARY OF THE INVENTION

The present invention provides an improved soft-feel handle and method of making the same. The handle is made of two component parts, a first part having a cushioning member wrapped in a thermoplastic sheath and a second part having both a cushioning member and a metallic strip which, together, are wrapped in a thermoplastic sheath.

The two parts are dielectrically sealed together with the seal of the first part and the seal of the second part adjacent each other and interiorly of the entire handle construction so that the dielectric seals are both hidden from view and cushioned from the hand of the user.

According to the method of the present invention, the first and second parts are each partially made and then positioned adjacent each other for the dielectric sealing operation.

BRIEF DESCRIPTION OF THE DRAWINGS

The foregoing objects and advantages of the present invention, together with other objects and advantages which may be attained by its use, will become apparent from the following detailed description taken in conjunction with the drawings.

In the drawings, wherein like reference numerals identify corresponding components:

FIG. 1 is a perspective illustration of an improved soft-feel handle made according to the principles of the present invention and shown mounted in suitable hardware or brackets;

FIG. 2 is a cross sectional view of the handle of the present invention as seen in the direction of arrows 2—2 of FIG. 1;

FIG. 3 is a partial side elevation view of the handle of FIG. 1 with the hardware or mounting bracket shown in outline; and FIG. 4 is a sectional side elevation of the dielectric sealing step according to the principles of the present invention.

DETAILED DESCRIPTION OF THE INVENTION

With reference to the drawings, an improved soft-feel handle 10 according to the principles of the present invention is illustrated including a first part 12 and a second part 14 joined together and mounted in brackets or hardware 16 as is conventional. The brackets or hardware 16 may be attached to the interior of an automobile, if the handle 10 is used as a passenger assist, or may be suitably secured to luggage or the like, also as is conventional.

The first part 12 of the handle includes a thin, flat elongated metallic conductive strip or core 20 positioned on one side of an elongated cushioning member 22. The core and cushion are surrounded by a thermoplastic sheath 24 having first and second longitudinal edges 26,28 positioned on the metallic core.

In practice, the core may be a flat spring steel bar generally 0.025 inch thick and the cushioning member may be generally 0.30 inch thick flexible resilient material such as foam polyurethane, polystyrene, polyester and rubber. The sheath 24 may be any suitable thermoplastic resin such as polyvinyl chloride, polyurethane or the like.

As part of the manufacturing process, the cushioning member 22 may be adhesively secured to both the thermoplastic sheath 24 and the metallic core 20.

The second part 14 of the handle also includes a cushioning member 30 which is narrower than the cushioning member 22 but, of course, may be of the same material. A filler strip 32, which may be paper impregnated with rubber, cotton duck, leather or the like, is positioned on one side of the cushioning member 30. A second thermoplastic sheath 34 is wrapped around the combination of the cushioning member 30 and the filler 32 with the ends 36 and 38 of the thermoplastic sheath positioned adjacent the filler material 32. In both the first and second handle parts, the sheath material is approximately .025 inches thick. The cushioning member 30 in the second handle part 14 may also be adhesively secured to both the filler 32 and the sheath 34.

The next step in the process is to dielectrically seal the ends of the thermoplastic sheath to provide a finished handle. To accomplish this a conventional dielectric machine 40 is utilized of the type having a fixed bed 42 and a vertically movable die 44.

According to the principles of the present invention, the die 44 includes two downwardly projecting spaced apart electrodes 46.

The first handle part 12 is placed in the well 48 of the bed 42 of the dielectric sealing machine and the second handle part 14 is placed above the first handle part so that the edges 26 and 28 of sheath 24 are positioned adjacent the edges 36 and 38 of the sheath 34. The electrodes are lowered into position and the machine turned on and current flows from the electrodes through the core 20 to dielectrically seal the sheath ends together.

Thus it may be appreciated that the seals of the sheaths are hidden from view with all the seals internally of the finished handle construction, i.e., each handle part overlies the seals of the opposite handle part.

In this fashion, not only are the seals hidden from view, but there are cushioning members on both sides of the seals, namely, cushioning members 22 and 30 and therefore the seals are not felt by the hand with the handle is gripped.

To facilitate attaching the handle to conventional brackets 16, two additional improvements are provided according to the principles of the present invention.

First, the ends of the second part of the handle are chamfered as at 50 to provide a gentle taper. Second, the core or metal strip 20 is bent as at 52 toward the direction of the chamfer. The core is apertured at each end as at 54, to receive a conventional fastener. The bracket 16 is illustrated in dashed lines in FIG. 3 for the purpose of illustrating the relative location of the parts.

The foregoing is a complete description of the improved handle and method of making the improved handle according to the principles of the present invention. Various changes may be made without departing from the spirit and scope of the present invention. The invention, therefore, should be limited only by the scope of the following claims.

What is claimed is:

1. An improved elongated soft-feel handle comprising:
    a first handle part including an elongated metallic core having first and second sides, a first elongated cushioning member positioned on the first side of said core, and a first elongated thermoplastic sheath surrounding said core and said first cushioning member, said first sheath having first and second longitudinal edges positioned on the second side of the metallic core;
    a second handle part including a second elongated cushioning member and a second elongated thermoplastic sheath surrounding said second cushioning member, said second elongated sheath having first and second longitudinal edges positioned on one side of said second cushioning member; and
    said first handle part and said second handle part joined together in an aligned relation so that each handle part overlies the longitudinal sheath edges of the opposite handle part.

2. The invention as defined in claim 1 wherein said second handle part includes a filler positioned intermediate the cushioning member and the first and second longitudinal edges of the thermoplastic sheath.

3. The invention as defined in claim 1 wherein the ends of said second handle part are chamfered toward the first handle part and wherein each end of the metallic core is bent upwardly toward said chamfer.

4. In an improved elongated soft-feel handle construction including an elongated flat metallic strip adapted to be secured to brackets or the like, the improvement comprising:
    a first cushioning member substantially coextensive with and adjacent one side of said metallic strip;
    a first thermoplastic sheath overlying said first cushioning member and having its longitudinal ends on the side of the metallic strip opposite from said first cushioning member;
    a second cushioning member;
    a second thermoplastic sheath surrounding said second cushioning member and having its longitudinal ends on one side thereof; and
    said second sheath and said second cushioning member positioned, as a sub-assembly, on said other side of said metallic strip so that the longitudinal ends of said first sheath are substantially adjacent the longitudinal ends of said second sheath so that each handle part overlies the longitudinal ends of the thermoplastic sheath of the opposite handle part.

* * * * *

UNITED STATES PATENT OFFICE
CERTIFICATE OF CORRECTION

Patent No. 4,047,263    Dated September 13, 1977

Inventor(s) Kenneth V. Tietze

It is certified that error appears in the above-identified patent and that said Letters Patent are hereby corrected as shown below:

On the cover sheet, in item [73] "Fair Haven, Conn." should read -- Fair Haven, Mich. --.

Signed and Sealed this

Twentieth Day of December 1977

[SEAL]

Attest:

RUTH C. MASON
Attesting Officer

LUTRELLE F. PARKER
Acting Commissioner of Patents and Trademarks